United States Patent [19]

Hanzawa et al.

[11] Patent Number: 5,338,576
[45] Date of Patent: Aug. 16, 1994

[54] SILICON CARBIDE SINTERED ARTICLE AND METHOD

[75] Inventors: Shigeru Hanzawa, Kagamihara; Tsuneo Komiyama, Toki, both of Japan

[73] Assignee: NGK Insulators, Ltd., Japan

[21] Appl. No.: 994,311

[22] Filed: Dec. 21, 1992

[30] Foreign Application Priority Data

Dec. 27, 1991 [JP] Japan .................. 3-345928
Dec. 15, 1992 [JP] Japan .................. 4-354033

[51] Int. Cl.$^5$ ................ C04B 35/56; C01B 31/36
[52] U.S. Cl. ................ 427/430.1; 427/376.2; 427/397.7; 427/431; 427/443.2; 264/56; 264/60; 501/88; 501/89; 501/90
[58] Field of Search ................ 501/88, 89, 90; 427/430.1, 443.2, 376.2, 397.7, 431; 264/56, 60

[56] References Cited

U.S. PATENT DOCUMENTS

| | | | |
|---|---|---|---|
| 4,141,948 | 2/1979 | Laskow et al. | 501/88 |
| 4,221,831 | 9/1980 | Kostikov et al. | 427/314 |
| 4,325,930 | 4/1982 | Vallet | 501/88 |
| 4,564,496 | 1/1986 | Gupta et al. | 501/88 |
| 4,722,762 | 2/1988 | Luhleich et al. | 156/305 |
| 5,019,430 | 5/1991 | Higgins et al. | 501/88 |
| 5,205,970 | 4/1993 | Brun et al. | 501/88 |

FOREIGN PATENT DOCUMENTS

| | | |
|---|---|---|
| 0228166 | 7/1987 | European Pat. Off. . |
| 0334415 | 9/1989 | European Pat. Off. . |
| 0409983 | 1/1991 | European Pat. Off. . |
| 2834315 | 3/1979 | Fed. Rep. of Germany . |
| 3037199 | 4/1982 | Fed. Rep. of Germany . |
| 3108266 | 9/1982 | Fed. Rep. of Germany . |
| 3116786 | 11/1982 | Fed. Rep. of Germany . |
| 632247 | 11/1949 | United Kingdom . |

OTHER PUBLICATIONS

Kawamura, K.; et al.: Silicon Carbide/Carbon Composite Sheets Derived From PCS/Coal-Tar Pitch Mixtures. In: Carbon, 1992, 3, vol. 30, S. 429–434, insb. Fig. 4, u. S. 432 Li Sp.

Hase, T.; et al.: Formation Process of β-SiC During Reaction–sintering. In: Journal of Nuclear Materials 59, 1976, S.42–48; insb. Kap.2.3, table 1.

*Primary Examiner*—Anthony Green
*Attorney, Agent, or Firm*—Parkhurst, Wendel & Rossi

[57] ABSTRACT

A silicon-carbide sintered article prepared by permeating molten silicon into a carbon compact of elemental carbon, wherein Lc(002), which indicates a length of a domain in the direction perpendicular to the C(002) surface of elemental carbon in the carbon compact, is up to 1000 angstrom. The resulting article includes silicon carbide, silicon, and up to about 1 percent by weight of residual elemental carbon based on the sum of the silicon carbide and the silicon.

16 Claims, 1 Drawing Sheet

SILICON CARBIDE SINTERED ARTICLE AND METHOD

BACKGROUND OF THE INVENTION

This invention relates to a silicon carbide sintered article and to a method for making the same. The silicon carbide sintered article of the present invention is suitable for a shelf inside a rapid firing furnace.

Silicon carbide ceramic is excellent in heat resistance and fire resistance and has various industrial applications. Silicon carbide ceramic is used as material for, for example, a shelf to hold ceramics in a kiln or in a furnace and a central tube in a furnace to fire semiconductors.

A prior art method for making a silicon-carbide ceramic includes the steps of: adding carbon powders and a binder to α-silicon powders; mixing the mixture; forming the resulting mixture into a compact; and firing the compact under a silicon atmosphere. A silicon-carbide ceramic thus obtained includes grains of α-silicon carbide resulting from the starting compound and grains of β-silicon carbide dispersed around the grains of the α-form. The β-silicon carbide is formed by the reaction of carbon and silicon. Pores which were made during the reaction are filled by silicon.

FIG. 2 is a scanning electron microscope photograph of a silicon-carbide sintered article thus obtained. The photograph has the same magnification as the photograph in FIG. 1. The white part in FIG. 2 shows grains of α-silicon carbide.

An alternative prior art method for making a silicon-carbide ceramic includes steps of adding a binder and ingredients for forming glass to α-silicon carbide powders; mixing the mixture; forming the resulting mixture into a compact; and firing the compact under an oxidizing atmosphere.

These methods give thick ceramics, and such thick ceramics are not suitable for certain applications. A thick ceramic tends to have a large heat capacitance, thus upon heating heat distribution generated in the ceramic decreases its thermal shock resistance. Moreover, a thick ceramic is susceptible to having pores inside, thus reducing its oxidation resistance.

Prior act silicon-carbide ceramics do not include any special antioxidant. Such a ceramic is prone likely to have limited oxidation resistance.

One approach to make a thin silicon-carbide ceramic is to make α-silicon carbide powders finer. This approach, however, increases the cost of making the ceramic. Without making the powders finer, a thin compact does not have sufficient mechanical strength so that it cannot maintain its shape during firing.

SUMMARY OF THE INVENTION

An object of the present invention is to provide a thin silicon-carbide sintered article, which has excellent thermal shock resistance and oxidation resistance and a method for making the same.

According to the first aspect of the present invention, there is provided a silicon-carbide sintered article prepared by a process comprising the step of: permeating molten silicon into a carbon compact consisting essentially of elemental carbon, wherein Lc(002), which indicates a length of a domain in the direction perpendicular to the C(002) surface of elemental carbon in the carbon compact, is up to 1000 angstrom.

The elemental carbon in the carbon compact may be graphite.

Preferably the Lc(002) is up to 800 angstrom. The Lc(002) may be up to 500 angstrom.

According to the second aspect of the present invention, there is provided a silicon-carbide sintered article, comprising: silicon carbide, silicon, and up to about 1 percent by weight of elemental carbon based on sum of the silicon carbide and the silicon, the article being prepared by permeating molten silicon into a carbon compact consisting essentially of elemental carbon.

Preferably the silicon carbide has an amount of about 50–99.5 parts by weight, the silicon is present in an amount of about 50–0.5 parts by weight; and the elemental carbon in the article present in an amount of up to about 1 part by weight.

Favorably the elemental carbon in the carbon compact is graphite and the elemental carbon in the article is graphite.

Preferably the article has a porosity up to about 10% by volume.

The article may be essentially formed from a carbon compact including at least about 99% by weight of elemental carbon.

Preferably the silicon carbide consists essentially of its β-form.

The article may have the thickness ranging from about 0.3 to 10 mm.

Preferably the article includes about 0.01–3 parts by weight of at least one element selected from a group consisting of Fe, Ca, and Al.

The elemental carbon in the article may have an amount of up to about 0.5 part by weight.

According to the third aspect of the present invention, there is provided a method for making a silicon-carbide sintered article, comprising the step of permeating molten silicon into a carbon compact including at least about 99% by weight of elemental carbon at a temperature of from 1450° C. to 2500° C. in an inert atmosphere under reduced pressure, wherein Lc(002), which indicates a length of a domain in the direction perpendicular to the C(002) surface of elemental carbon in the carbon compact, is up to 1000 angstrom.

Preferably the elemental carbon in the carbon compact is graphite.

The article may include silicon carbide, silicon, and up to about 1 part by weight of elemental carbon based on the sum of the silicon carbide and the silicon.

BRIEF DESCRIPTION OF THE DRAWING

Further details are explained below with the help of the examples illustrated in the attached drawings in which.

DETAILED DESCRIPTION OF THE PREFERRED EMBODIMENT

Figure 1:
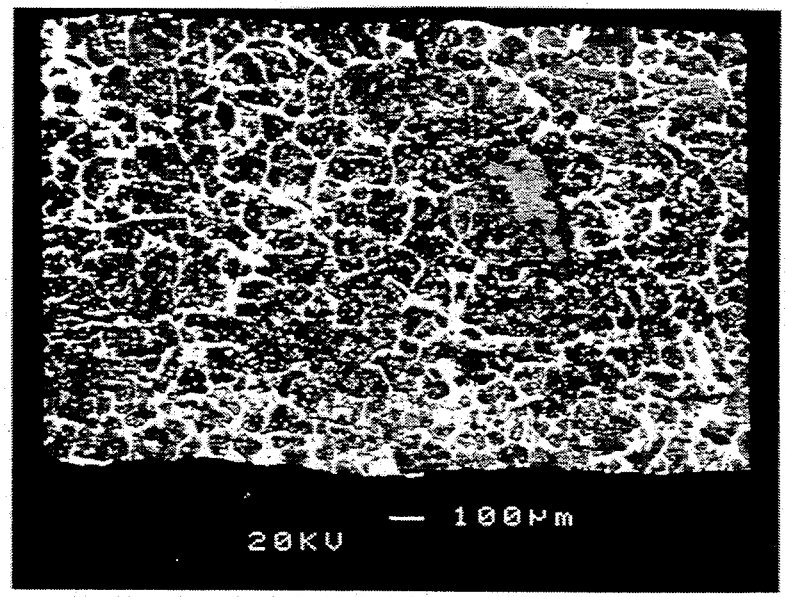
FIG. 1 is a scanning electron microscope photograph of the silicon-carbide sintered article of the present invention.
Figure 2:
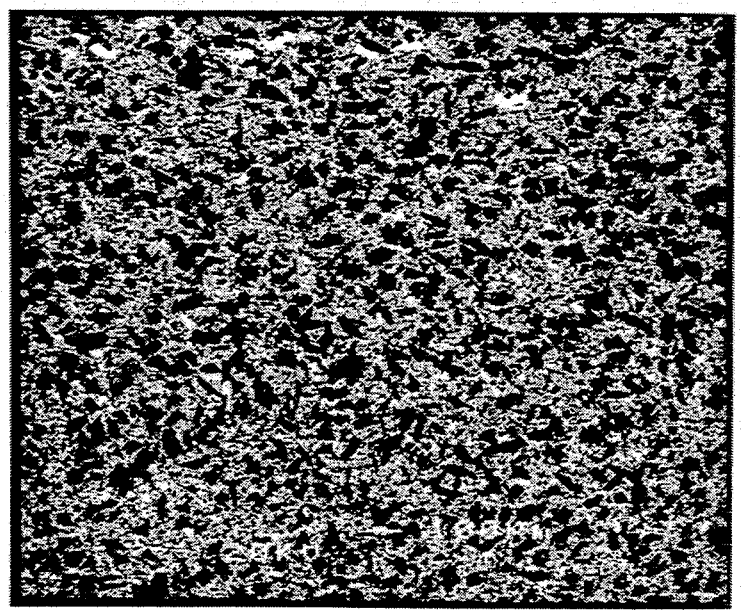
FIG. 2 is a scanning electron microscope photograph of a prior art silicon-carbide sintered article in prior art having the same magnification as the photograph of FIG. 1.

The silicon-carbide sintered article of the present invention may include about 50–99.5 parts by weight of silicon carbide, about 50–0.5 parts by weight of silicon, and up to about 1 part by weight of elemental carbon.

A silicon-carbide sintered article including less than 50 parts by weight of silicon carbide may not have satisfactory mechanical strength or thermal shock resistance. Likewise a silicon-carbide sintered article including more than 50 parts by weight of silicon may not have satisfactory mechanical strength or thermal shock resistance either.

The sintered article of the present invention may include at least 0.5 parts by weight of silicon to fill pores in the carbon compact and to cover the surfaces of the resultant sintered article. The sintered article is formed from a carbon compact including pores, and molten silicon permeates the pores to react with carbon in the compact to form silicon nitride.

The silicon-carbide sintered article of the present invention includes silicon carbide and silicon. An amount of elemental carbon in the article is up to about 1 percent by weight based on the sum of the silicon carbide and the silicon in the article. Preferably the sintered article includes up to about 0.5 parts by weight of elemental carbon. It is more preferable that the sintered article includes up to about 0.2 parts by weight of elemental carbon.

Alternatively tile sintered article may include an amount of elemental carbon smaller than 1% by mole of the amount of the silicon carbide in the sintered article.

The term "elemental carbon" refers to carbon not chemically combined with or to the other elements. Examples of elemental carbon include commercially available graphite and carbon fibers.

Elemental carbon in the sintered article of the invention may react with oxygen to form carbon dioxide, leaving pores where the reacted elemental carbon is present, when the article is subjected to high temperatures in an atmosphere containing oxygen, for example in air, during its application. The increase in pores in the article is not preferable as disclosed later. Moreover, the gas formation may cause cracks in the article. Thus the less elemental carbon in the article, the better.

The source of the elemental carbon in the sintered article of the invention is presumed to come from unreacted, residual elemental carbon in a carbon compact. An amount of the unreacted elemental carbon in the article depends on $L_o(002)$ in the carbon compact, which indicates a length of a domain in the direction perpendicular to the C(002) surface of elemental carbon, such as graphite, in the carbon compact.

Preferably the sintered article of the present invention has a porosity up to 10% by volume. More preferably the sintered article has a porosity up to 5% by volume. It is still more preferable that the sintered article has a porosity up to 1% by volume.

When the sintered article of the invention is subjected to temperatures higher than 900° C. in an atmosphere containing oxygen, for example in air, silicon carbide on the surfaces in the pores is susceptible to the reaction with oxygen to give silicon dioxide on the surfaces. This reaction is not preferable because the reaction may cause an internal strain and cracks due to a volume increase in the sintered article. Thus the less porosity in the sintered article, the better. Therefore, a sintered article having a porosity larger than 10% does not have satisfactory oxidation resistance at high temperatures in an oxidizing atmosphere.

The article of the present invention may have a thickness ranging from about 0.3 to 10 mm. An article having a thickness less than 0.3 mm does not have a satisfactory mechanical strength. On the other hand an article having a thickness larger than 10 mm tends to have pores inside the article to result in inferior oxidation resistance.

The article of the present invention is formed from a carbon compact. A carbon compact may have a planar structure, and a carbon compact may be formed into such a structure. The compact has fine pores so that molten silicon can infiltrate into the compact.

A carbon contact may be a graphite sheet, a carbon sheet, a carbon felt, a carbon fiber cloth, etc.

Preferably a carbon compact includes at least about 99% by weight of elemental carbon. A carbon compact including at least about 99.99% by weight of elemental carbon is more preferable. A carbon contact including less than about 99% of elemental carbon tends to give a sintered article including an insufficient amount of silicon carbide so that the article does not have satisfactory properties, such as thermal shock resistance.

Preferably a carbon compact has a little ash content, and specifically up to 0.5 percent by weight of an ash content in the compact is favorable.

Preferably a carbon compact has a density larger than 0.3 g/cm$^3$, and more preferably a carbon compact has a density larger than 0.9 g/cm$^3$. For example graphite sheets under the trade name of SIGRAFLEX® and PERMAFOIL® have densities about 1 g/cm$^3$. A carbon compact having its density up to about 2 g/cm$^3$ may be used to prepare the sintered article of the invention.

Lc(002), which indicates a length of a domain in the direction perpendicular to the C(002) surface of elemental carbon, such as graphite, in molecular microstructures in the carbon compact, is smaller than or equal to 1000 angstrom. Preferably Lc(002) is up to 800 angstrom. More preferably Lc(002) is up to 500 angstrom.

The domain is an assembly of crystal lattices. The Lc(002) of the graphite carbon indicates a length of a domain in the direction perpendicular to layers consisting of elemental carbons in a honeycomb structure, i.e. along the c axis of molecular graphite layers.

The Lc(002) of elemental carbon in the carbon compact is obtained by a process of recording diffractions of carbon 002 and silicon 111, which is used as internal standard, and analyzing these diffraction peaks. A detailed procedure is given in the Examples.

When the Lc(002) of elemental carbon in a carbon compact is larger than 1000 angstrom, carbon on the surfaces of the compact reacts with molten silicon to form silicon carbide; in contrast carbon inside of the same compact is less reactive with molten silicon. Thus, using a carbon compact having Lc(002) larger than 1000 angstrom, in some cases about 60–80% of carbon in the carbon compact reacts with molten silicon while the rest of carbon in the compact remains unreacted. In other cases about 5–10% of the carbons in the carbon compact was observed in the resulting sintered article.

On the other hand when the Lc(002) of elemental carbon in a carbon compact is smaller than or equal to 1000 angstrom, not only carbon on the surfaces of the compact but also carbon inside of the compact react with molten silicon to form silicon carbide so that less than 1% of the carbon in the compact remains unreacted in the resulting sintered article. Generally less than 0.8% of the carbon in the compact remains as elemental carbon in the resulting sintered article.

When the Lc(002) of elemental carbon in a planar carbon compact is larger than 1000 angstrom, during its reaction with molten silicon the compact considerably expands in its thickness, for example by more than 50%. This expansion is not favorable because the precision and the accuracy of the sintered article are prone to deteriorate. The compact, however, does not expand much in planar directions.

As the Lc(002) of elemental carbon in a carbon compact decreases from 1000 angstrom to 800 angstrom to 500 angstrom, the expansion in the thickness of the compact during the reaction decreases to, for example 10-20% The expansion is considered to relate to pore formation in the sintered article.

A graphite sheet is preferable as a carbon compact. The term "sheet" includes a planar structure. Preferably a graphite sheet includes at least about 99% by weight of graphite. Alternatively the graphite sheet may contain carbon fibers.

Preferably a graphite sheet has a sheet structure in which thin pieces of graphite are laminated together. A graphite sheet commercially available may be used to prepare the sintered article of the invention; for example, under the trade name of SIGRAFLEX® from SIGRI Inc. in Germany, under the trade name of PERMAFOIL® from Toyo Tanso Co. Ltd. in Osaka, Japan.

A carbon sheet is preferable as a carbon compact also. A carbon sheet refers to a shaped sheet structure which includes or consist essentially of carbon fibers. Carbon fibers may be braided into strands, and strands having diameters smaller than 0.5 mm braided together to form a carbon sheet. Alternatively carbon fibers may be bound together by binders.

Preferably the silicon carbide in the sintered article of the present invention essentially consists of its $\beta$-form. Silicon carbide in the $\alpha$-form instead of $\beta$-form in the article deteriorates thermal shock impact of the article.

Preferably the sintered article of the present invention includes about 0.01-3 percent by weight of at least one element selected from a group consisting of Fe, Ca, and Al to the sum of the silicon carbide and the silicon in the article. These elements in the article improves its oxidation resistance. These elements may be incorporated into the article, for example, by immersing the sintered article into an appropriate slurry including these elements, and firing the article again.

A method for making a silicon-carbide sintered article of the invention is disclosed hereinafter.

A carbon crucible is used to hold silicon powders and a carbon compact. Preferably the crucible is dense so that molten silicon does not permeate the crucible by capillary action. Preferably the surfaces of the crucible are coated by boron nitride.

About 0.01-3 percent by weight of at least one compound that includes one element selected from a group consisting of Fe, Ca, and Al may be added based on the sum of the silicon powders.

A planar carbon compact is vertically held in a crucible in a furnace so that upon firing a lower part of the compact is immersed into molten silicon so that molten silicon infiltrates into the carbon compact. A size of the crucible and an amount of silicon are controlled so that a lower part of the compact is immersed in molten silicon.

The carbon compact and silicon powders are heated at a temperature ranging from about 1450°-2500° C. in an inert atmosphere under a reduced pressure. Examples of the inert atmosphere include argon, helium, nitrogen, and a mixture or these gases. An argon atmosphere is preferable to a helium atmosphere, and a helium atmosphere is preferable to a nitrogen atmosphere because molten silicon infiltrates into the carbon compact slower in this order.

During the firing step molten silicon infiltrates into the graphite sheet through pores in the sheet by capillary action so as to react with elemental carbon in the compact to give a silicon-carbide sintered article. Silicon carbide thus formed essentially consists of the $\beta$-form.

A method for making silicon-carbide sintered article of the present invention gives a silicon-carbide sintered article, which is characterized by a low porosity, a low amount of residual elemental carbon, excellent thermal shock resistance and excellent oxidation resistance. Besides, the sintered article has a small heat capacity, and thus has smaller energy loss in some of its application. Moreover, the sintered article of the invention maintains its mechanical strength at room temperature to a considerable extent up to temperatures higher than 1000° C.

Thus the sintered article of the invention can be applied to various types of members that require mechanical strength at high temperatures and thermal shock resistance, for example, a shelf in a rapid firing furnace, devices used in a kiln such as a ceramic tap without the top and a ceramic container, heat-resistant members in an internal combustion mechanism, heat-resistant members in a gas turbine such as a turbine blade, a heater, a radiator substrate, a radiator tube, etc. Especially the sintered article of the invention is suitably applied to a shelf to hold tiles to be fired in a roller hearth kiln. Since the sintered article of the invention can be a thin plate with a small density, the article is favorably applied to a shelf in a furnace to fire ceramics. The article may be used as a central tube in a furnace to fire semiconductors.

EXAMPLE

A graphite sheet under the trade name of PERMAFOIL® was purchased from Toyo Tanso Co. Ltd. The sheet includes about 99.7% by weight of graphite and about 0.1% by weight of an ash content. The sheet has a density of 1.0 g/cm$^3$ and has a size of 200 mm×200 mm×2 mm.

The sheet was vertically held in a crucible that contains silicon powders having an average diameter of about 1 mm. The silicon powders had purity of 99.8%.

The crucible with the graphite sheet and the silicon powders were placed in a furnace, and they were heated to 1700° C. in an argon atmosphere under 0.05 atm and maintained at that temperature for three hours to give a sintered article.

The sintered article thus obtained includes about 80% by weight of $\beta$-silicon carbide and about 20% by weight of silicon.

Amounts of calcium, iron, aluminum, and carbon were measured by fluorescent X-ray analysis. To the sum of the silicon carbide and silicon as 100%, the article contains about 0.1% by weight of calcium, about 0.05% by weight of iron, and about 0.05% by weight of aluminium. Carbon was not detected, indicating that an amount of carbon is less than 0.1% by weight.

A Method for evaluating thermal shock resistance

A square aluminum plate having a shape of 100 mm×100 mm×10 mm was placed onto a silicon-carbide sintered article having a square shape of 200 mm×200 mm with a varying thickness. Then the aluminum plate and the sintered article were heated in a furnace to a temperature indicated in Tables 1 and 2, and then they were taken out of the furnace and left standing at room temperature. This cycle was repeated for a number of times indicated in Tables 1 and 2. After the cycles or each cycle, the presence of cracks in the sintered article was visually observed. ΔT designates his thermal shock resistance test in Tables 1 and 2.

The presence of α-silicon carbide and β-silicon carbide in a sintered article were observed by X-ray crystallography. The Kα ray from Cu was used as the X-ray source. The electricity of 40 kV and 30 mA was applied to the tube, and a sample was scanned at the rate of one degree per a minute.

These results and conditions are shown in Table 1.

The composition of the each of the sintered articles are shown in Table 1.

Thermal shock resistance tests show that sintered articles of Examples 2-12 of the present invention did not give cracks. In contrast when the compacts were fired under condition outside of the invention in Comparative Examples 1-3 did not give silicon-carbide sintered articles. These conditions and the results are tabulated in Table 1.

FIG. 1 is a scanning electron microscope photograph of the sintered article of Example 6. A dark part of the photograph indicates β-silicon carbide and a white part indicates silicon. Without silicon the white part would have formed pores.

TABLE 1

| | Graphite sheet | thickness (mm) | density (g/cm$^3$) | firing temp (°C.) | atomosphere | pressure (atm) | SiC content (wt %) | β-SiC content in SiC % | Si content (wt %) | porosity (%) | ΔT evaluation | Visual observation |
|---|---|---|---|---|---|---|---|---|---|---|---|---|
| Examples | | | | | | | | | | | | |
| 1 | PERMAFOIL | 2.00 | 1.0 | 1700 | Ar | 0.05 | 80 | 100 | 20 | 0.3 | 600° C. × 5 cycle | no crack |
| 2 | PERMAFOIL | 0.38 | 1.0 | 1700 | Ar | 0.1 | 85 | 100 | 15 | 1.0 | 600° C. × 5 cycle | no crack |
| 3 | PERMAFOIL | 1.00 | 1.0 | 1700 | N$_2$ | 0.01 | 80 | 100 | 20 | 0.2 | 600° C. × 5 cycle | no crack |
| 4 | PERMAFOIL | 3.50 | 1.0 | 1700 | Ar | 0.05 | 85 | 100 | 15 | 0.15 | 600° C. × 5 cycle | no crack |
| 5 | PERMAFOIL | *5.00 | 1.0 | 1800 | Ar | 0.05 | 80 | 100 | 20 | 1.5 | 600° C. × 5 cycle | no crack |
| 6 | SIGRAFLEX | 0.20 | 1.0 | 1700 | Ar | 0.5 | 75 | 100 | 25 | 2.0 | 500° C. × 5 cycle | no crack |
| 7 | SIGRAFLEX | 0.50 | 0.7 | 1700 | N$_2$ | 0.01 | 50 | 100 | 50 | 4.5 | 600° C. × 5 cycle | no crack |
| 8 | SIGRAFLEX | 2.00 | 0.7 | 1800 | Ar | 0.05 | 65 | 100 | 35 | 3.5 | 600° C. × 5 cycle | no crack |
| 9 | SIGRAFLEX | 0.50 | 1.0 | 1800 | He | 0.05 | 80 | 100 | 20 | 0.5 | 600° C. × 5 cycle | no crack |
| 10 | SIGRAFLEX | 0.50 | 1.0 | 1480 | Ar | 0.1 | 75 | 100 | 25 | 8.5 | 600° C. × 5 cycle | no crack |
| 11 | SIGRAFLEX | 0.50 | 1.0 | 2000 | Vacuum | 0.005 | 85 | 100 | 15 | 0.3 | 600° C. × 5 cycle | no crack |
| 12 | SIGRAFLEX | 0.50 | 1.0 | 2400 | Ar | 0.1 | 85 | ***90 | 15 | 0.5 | 600° C. × 5 cycle | no crack |
| Comparative Ex. | | | | | | | | | | | | |
| 1 | PERMAFOIL | 0.38 | 1.0 | 1400 | Ar | 1.0 | **u | — | — | — | — | not sintered |
| 2 | PERMAFOIL | 0.38 | 1.0 | 1700 | N$_2$ | 1.0 | **u | — | — | — | — | not sintered |
| 3 | PERMAFOIL | 0.38 | 1.0 | 1700 | He | 0.8 | **u | — | — | — | — | not sintered |
| 4 | NIKAFILM | 0.5 | 0.7 | 1800 | Ar | 0.05 | **u | — | — | 10 | — | not sintered |

Note:
**u designates unidentifiable.
***The remaining 10% was not identifiable.

Examples 2-12; Comparative Examples 1-40

The type, the thickness, and the density of a graphite sheet were chosen as shown in Table 1, and a firing temperature, an atmosphere, and a pressure were chosen in each of Examples 2-12 and Comparative Examples 5-8 at Table 1. The other conditions were kept the same as those in

EXAMPLE 1

In Example 5 five sheets of PERMAFOIL® were stacked and combined by organic adhesive to form a compact having a width of 5 mm.

Examples 13-18; Comparative Examples 5-8

A graphite sheet under the trade name of SIGRAFLEX® was purchased from SIGRI. The sheet has a density of 1.0 or 0.8 g/cm$^3$. (The sheet has a size of 200 mm × 200 mm × 2. The graphite sheet with silicon powders were heated to 1800° C. An atmosphere, a pressure, an amount of silicon powders were changed from those in Example 1. The other conditions are kept the same as those in Example 1.

In Example 13 and Comparative Example 8 a graphite sheet was compressed at a pressure of 300 kgf/cm$^2$ by hot press and then fired again with the presence of molten silicon. The resulting sintered article contains a small amount of silicon.

In Example 13 after firing the graphite sheet, the sintered article was treated by a slurry of calcium chloride and aluminum lactate, followed by another firing at 1400° C.

In Examples 14–18 appropriate amounts of powders of $CaCO_3$, $Al_2O_3$, and/or $Fe_2O_3$ were added to silicon powders.

The composition of the sintered article of each Example is tabulated in Table 2.

In Comparative Examples 5–8 silicon powders having a purity of at least 99.99% by weight was used without any calcium, aluminum, or iron source. The compacts did not undergo sintering.

In Comparative Example 7 some graphite remains after firing.

A thermal shock resistance test was carried out on each sintered article, and Table 2 shows the number of cycles between a specific temperature in the Table 2 and room temperature after which the article has cracks. Oxidation resistance of the article was measured in the same way as Example 1.

A four-point bending strength of each of the sintered articles of Examples 13–18 and of Comparative Examples 5–8 is measured at room temperature and at 1300° C. The ratio of the bending strength at room temperature to that at 1300° C. are shown in Table 2.

A method for evaluating oxidation resistance

A sintered article was maintained at 1100° C. for fifty hours in an oxygen atmosphere in which water vapor was saturated at 90° C. After the standing, the increase in the weight of the sintered article is tabulated in Table 2.

A graphite sheet was filed to give fine graphite powders. The graphite powders were passed through a standard 200-mesh sieve. Silicon powders purchased from ELKEM Co. were passed through a standard 330-mesh sieve. To the sieved graphite powders were added about 50% by weight of the sieved silicon powders to the graphite powders as internal standard. The mixture was thoroughly mixed in an agate mortar to give a sample for X-ray diffraction. The sample was uniformly placed on a sample plate.

The Cu-K$\alpha$ ray having a wavelength of 1.3418 angstrom was used as the X-ray source, and the Cu-K$\beta$ ray was removed by a monochromator. Electricity of 35 kV and a current of 20 mA are applied to the X-ray tube.

Divergence slit was set to 1°, a scattering slit was set to 0.15 mm, and a receiving slit was set to 1°. The step scan method was used. One step in the goniometer was set to 0.01°. It took one second for recording diffractions in each step. A diffraction angle was set to a range from 24° to 30°. The diffractions of carbon 002 and silicon 111 were recorded. The diffraction angle, 2$\theta$ and the line width at half height of each diffraction peak are tabulated in Tables 3, 4, and 5.

The diffraction angle, 2$\theta$ of a carbon 002 peak was calibrated by the average diffraction angle of a silicon 111 peak of 28.465. The lattice constant d of Si(111) is 3.13552. Considering the error in the diffraction angle 2$\theta$ of C(002) of 0.02°, the error in lattice constant is ±0.0025.

The observed line width at half height $B_0$ of a carbon 001 diffraction peak and the observed line width at half height $b_0$ of a silicon 111 diffraction peak gave values, $\Delta/B_0$ and $\Delta/b_0$, respectively (Tables 4 and 5). The $\Delta$ of C(002) diffraction peak is 0.067 and the $\Delta$ of Si(111)

TABLE 2

| | SiC (wt %) | β-SiC content in SiC (%) | Si (wt %) | Ca (wt %) | Al (wt %) | Fe (wt %) | porosity (%) | thickness (mm) | ΔT (°C.) | ΔT number of cycle | ratio of bending strength (room temp./ 1300° C.) | oxidation resistance (wt %) |
|---|---|---|---|---|---|---|---|---|---|---|---|---|
| Examples | | | | | | | | | | | | |
| 13 | 99.5 | 100 | 0.5 | 0.10 | 0.10 | 0.05 | 0.1 | 0.2 | 500 | at least 5 | 1/1.03 | 0.12 |
| 14 | 91.0 | 100 | 9.0 | 0.01 | ≦0.001 | ≦0.001 | 0.3 | 0.35 | 500 | at least 5 | 1/1.08 | 0.10 |
| 15 | 80.0 | 100 | 20.0 | 0.35 | 0.25 | 0.10 | 1.0 | 0.5 | 500 | at least 5 | 1/1.05 | 0.16 |
| 16 | 65.0 | 100 | 35.0 | 0.55 | 0.45 | 0.20 | 3.5 | 2.0 | 600 | at least 5 | 1/1.01 | 0.21 |
| 17 | 50.0 | 100 | 50.0 | 0.85 | 0.65 | 0.30 | 4.5 | 0.5 | 600 | at least 5 | 1/0.98 | 0.19 |
| 18 | 50.0 | 100 | 50.0 | 1.10 | 1.05 | 0.85 | 9.5 | 3.5 | 650 | at least 5 | 1/0.99 | 0.28 |
| Comparative Ex. | | | | | | | | | | | | |
| 5 | 50.0 | 100 | 50.0 | ≦0.001 | ≦0.001 | ≦0.001 | 12.5 | 3.5 | 500 | 1* | 1/0.83 | 1.93 |
| 6 | 40.0 | 100 | 60.0 | ≦0.001 | ≦0.001 | ≦0.001 | 5.5 | 2.0 | 500 | 1* | 1/0.88 | 1.55 |
| 7 | 35.0 | 100 | 40.0 | ≦0.001 | ≦0.001 | ≦0.001 | 15.5 | 0.35 | 500 | 1* | 1/0.33 | 4.37 |
| 8 | 99.5 | 100 | 0.5 | ≦0.001 | ≦0.001 | ≦0.001 | 0.1 | 0.2 | 500 | at least 5 | 1/1.01 | 1.02 |

Note:
1* designates one cycle makes the article cracked.

A method for observing Lc(002)

Diffraction of carbon 002 in a graphite sample was recorded on a Rigaku Denki RINT 1000 X-ray diffractometer having an automated recording equipment. Such graphite sheets as NIKAFILM ®, SIGRAFLEX ®, and PERMAFOIL ® were purchased from NIHON CARBON CO., SIGRI, and TOYO TANSO CO., respectively. A phosphorus-type graphite under a trade name of PTF was purchased from NIHON KOKUEN CO. A recording method of Lc(002) and its data analysis are disclosed in Ootani, S. "Carbon Fiber"; Kindai-Henshu-sha; Tokyo, 1986; pp 733–741 and Inagaki, M. "Carbon-X Manual" Ed. Carbon Material Society; Riaraizu-sha; Tokyo, 1987;pp 21–27.

diffraction peak is 0.073.

Using graphs 2 and 3 at page 739 in "Carbon Fiber", the $\Delta/B_0$ value and the $\Delta/b_0$ value are correlated to a $B/B_0$ value and a $b/b_0$ value, respectively. The $B/B_0$ and the $b/b_0$ values give true half width $\beta$ in radian. To substitute $\beta$ into the equation (1) gives Lc(002), which indicates a length of a domain in the direction of the c axis. The analysis is shown in Table 6.

$$Lc(002) = 90/\beta \tag{1}$$

It is to be understood that various alterations, modifications and/or additions may be made to the features of the possible and preferred embodiments of the invention as herein described without departing from the scope of the invention as defined above.

TABLE 3

| | 2θ | | | d |
|---|---|---|---|---|
| | C(002) | Si(111) | C(002)+ | C(002) |
| PTF | 26.522 | 28.420 | 26.567 | 3.355 |
| NIKAFILM | 26.595 | 28.495 | 26.565 | 3.355 |
| SIGRAFLEX | 26.510 | 28.424 | 26.551 | 3.357 |
| PERMAFOIL | 26.537 | 28.589 | 26.558 | 3.356 |

+after calibration

TABLE 4

| Line width at the half height of C(002) diffraction peaks | | | | |
|---|---|---|---|---|
| | $B_o$ | $\Delta/B_o$ | $B/B_o$ | B |
| PTF | 0.145 | 0.462 | 0.75 | 0.109 |
| NIKAFILM | 0.205 | 0.327 | 0.89 | 0.182 |
| SIGRAFLEX | 0.29 | 0.231 | 0.955 | 0.277 |
| PERMAFOIL | 0.23 | 0.291 | 0.92 | 0.212 |

TABLE 5

| Line Width at the half height of Si(111) diffraction peaks | | | | |
|---|---|---|---|---|
| | $b_o$ | $\Delta/b_o$ | $b/b_o$ | b |
| PTF | 0.13 | 0.562 | 0.635 | 0.083 |
| NIKAFILM | 0.115 | 0.471 | 0.735 | 0.114 |
| SIGRAFLEX | 0.145 | 0.503 | 0.695 | 0.101 |
| PERMAFOIL | 0.15 | 0.487 | 0.715 | 0.107 |

TABLE 6

| | b/B | β/B | β | $L_c(002)$ |
|---|---|---|---|---|
| PTF | 0.761 | 0.28 | 0.031 | 2935 |
| NIKAFILM | 0.626 | 0.44 | 0.080 | 1138 |
| SIGRAFLEX | 0.365 | 0.74 | 0.205 | 444 |
| PERMAFOIL | 0.506 | 0.56 | 0.118 | 768 |

What is claimed is:

1. A silicon-carbide sintered article prepared by a process comprising the step of:
   permeating molten silicon into a carbon compact having a plurality of domains consisting essentially of elemental carbon,
   wherein Lc(002), which indicates a length of a domain in the direction perpendicular to a C(002) surface of elemental carbon in the carbon compact, is no greater than 1000 angstrom.

2. A silicon-carbide sintered article according to claim 1, wherein the elemental carbon in the carbon compact is graphite.

3. A silicon-carbide sintered article according to claim 2, wherein Lc(002) is no greater than 800 angstrom.

4. A silicon-carbide sintered article according to claim 3, wherein Lc(002) is no greater than 500 angstrom.

5. A silicon-carbide sintered article according to claim 1, wherein said sintered article comprises:
   silicon carbide;
   silicon; and
   up to about 1 percent by weight of elemental carbon based on the sum of said silicon carbide and said silicon.

6. A silicon-carbide sintered article according to claim 5, wherein said silicon carbide is present in an amount of about 50-99.5 parts by weight;
   said silicon is present in an amount of about 50-0.5 parts by weight; and
   said elemental carbon is present in an amount of up to about 1 part by weight.

7. A silicon-carbide sintered article according to claim 1, wherein said carbon compact is a graphite sheet.

8. A silicon-carbide sintered article according to claim 1, where said sintered article has a porosity up to about 10% by volume.

9. A silicon-carbide sintered article according to claim 1, wherein said silicon carbide consists essentially of β-silicon carbide.

10. A silicon-carbide sintered article according to claim 1 wherein said sintered article has a thickness ranging from about 0.3 to 10 mm.

11. A silicon-carbide sintered article according to claim 6, further comprising:
   about 0.01-3 parts by weight of at least one element selected from the group consisting of Fe, Ca, and Al.

12. A silicon-carbide sintered article according to claim 6, wherein said elemental carbon is present in an amount of up to about 0.5 parts by weight.

13. A method of making a silicon-carbide sintered article, comprising the steps of:
   providing a carbon compact comprising at least about 99% by weight of elemental carbon and having a plurality of domains consisting essentially of said elemental carbon, wherein Lc(002), which indicates a length of a domain in the direction perpendicular to a C(002) surface of elemental carbon in the carbon compact, is no greater than 1000 angstrom; and
   permeating molten silicon into said carbon compact at a temperature of about 1450°-2500° C. in an inert atmosphere under reduced pressure to form said sintered article.

14. A method for making a silicon-carbide sintered article according to claim 13 wherein the elemental carbon in the carbon compact is graphite.

15. A method for making a silicon-carbide sintered article according to claim 14, wherein the carbon compact is a graphite sheet.

16. A method for making a silicon-carbide sintered article according to claim 14, wherein said sintered article comprises silicon carbide, silicon, and up to about 1 part by weight of elemental carbon based on the sum of said silicon carbide and said silicon.

* * * * *